United States Patent [19]

Choiniere

[11] Patent Number: 4,871,289
[45] Date of Patent: Oct. 3, 1989

[54] EXPANSION FASTENER

[75] Inventor: Stanley W. Choiniere, Southwick, Mass.

[73] Assignee: Olympic Manufacturing Group, Inc., Agawam, Mass.

[21] Appl. No.: 276,368

[22] Filed: Nov. 25, 1988

[51] Int. Cl.[4] .................... F16B 13/04; F16B 13/06
[52] U.S. Cl. ...................................... 411/48; 411/41; 411/60; 411/908
[58] Field of Search ............... 411/41, 45, 46, 48, 411/57, 60, 61, 71-73, 908

[56] References Cited

U.S. PATENT DOCUMENTS

| | | | |
|---|---|---|---|
| 3,044,340 | 7/1962 | Luhm | 411/60 |
| 3,461,772 | 8/1969 | Barry | 411/60 |
| 3,765,295 | 10/1973 | Ptak | 411/41 |
| 4,375,342 | 3/1983 | Wollar et al. | 411/45 |
| 4,405,272 | 9/1983 | Wollar | 411/45 |
| 4,571,134 | 2/1986 | Beglinger et al. | 411/41 |
| 4,662,808 | 5/1987 | Camilleri | 411/60 |

Primary Examiner—Neill R. Wilson
Attorney, Agent, or Firm—Chilton, Alix & Van Kirk

[57] ABSTRACT

An expansion fastener includes a fastener body which has a pair of integral axial anchoring sections. An expander pin is drivable into a throat of the fastener body to force apart the anchoring sections.

14 Claims, 2 Drawing Sheets

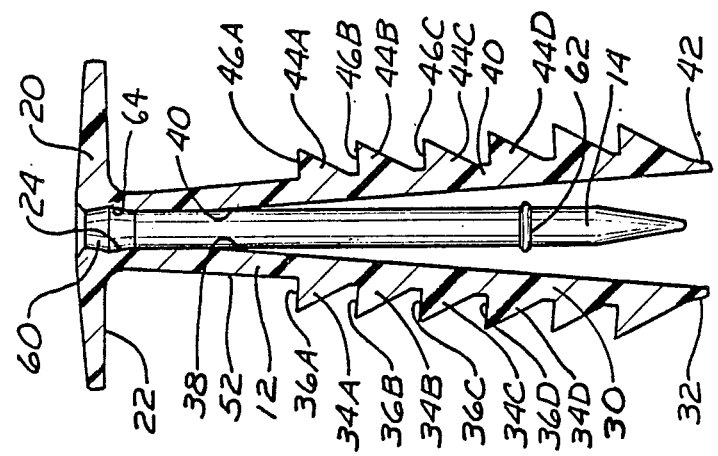
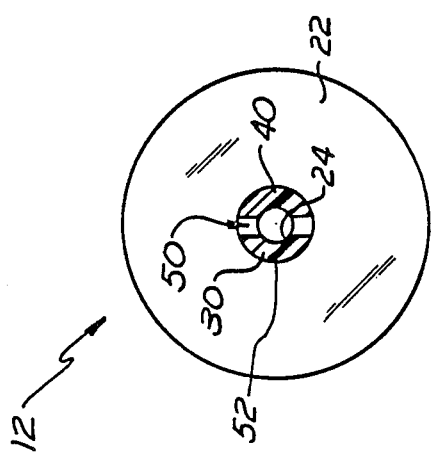

4,871,289

EXPANSION FASTENER

BACKGROUND OF THE INVENTION

This invention relates generally to fasteners which are employed to fasten roofing membrane material or roofing insulation to a roof deck. More particularly, this invention relates to fasteners which upon installation are expandable to enhance the fastening integrity.

In roofing systems to which the invention has particular applicability, fasteners are conventionally employed to secure roof insulation or roofing membrane material to the deck of the roof. The roof deck is typically formed of cementitious wood fiber, gypsum or lightweight concrete. The membrane material and insulation is typically configured in large sheets. Multiple fasteners are inserted through the membrane or insulation and anchored in the deck in a manner which ensures that the roof material will remain fastened in place.

BRIEF SUMMARY OF THE INVENTION

Briefly stated, the invention in a preferred form is an expansion fastener for fastening roofing membrane material or roofing insulation to a deck. The fastener comprises a body which has a head portion. A throat extends axially through the head portion generally centrally thereof. A pair of axially extending anchor shafts integrally extend from the head portion and are insertable into a bore of the deck in an unloaded non-expanded mode. The anchor sections have opposing interior surfaces which define an axial through slot communicating with the throat. The anchor shafts form a rounded exterior receiving surface and a series of axially spaced teeth which radially project to define generally aligned pairs of arcuate transverse shoulders. A pin which has a head and a longitudinally extending body terminating in a tapered tip is dimensioned to be closely received in the throat. The pin is insertable into the throat and is drivable into the fastener body so that the pin extends into the slot and interacts with the opposing interior shafts to force the anchor sections apart to thereby radially expand the fastener into a loaded expanded engagement with the bore defining walls of the deck.

An object of the invention is to provide a new and improved expansion fastener for fastening roofing insulation or roofing membrane material to a roof deck.

Another object of the invention is to provide a new and improved fastener which may be inserted into a roof deck and transformed into an expanded mode in a highly efficient and reliable manner.

A further object of the invention is to provide a new and improved expansion fastener having an efficient and low-cost construction which provides a high degree of fastening integrity.

Other objects and advantages of the invention will become apparent from the drawings and the specification.

BRIEF DESCRIPTION OF THE DRAWINGS

FIG. 2 is a bottom view of the fastener body of FIG. 1; and

FIG. 3 is an axial sectional view of the expansion fastener of FIG. 1 illustrated in the loaded expanded mode.

DETAILED DESCRIPTION OF THE INVENTION

Figure 1:
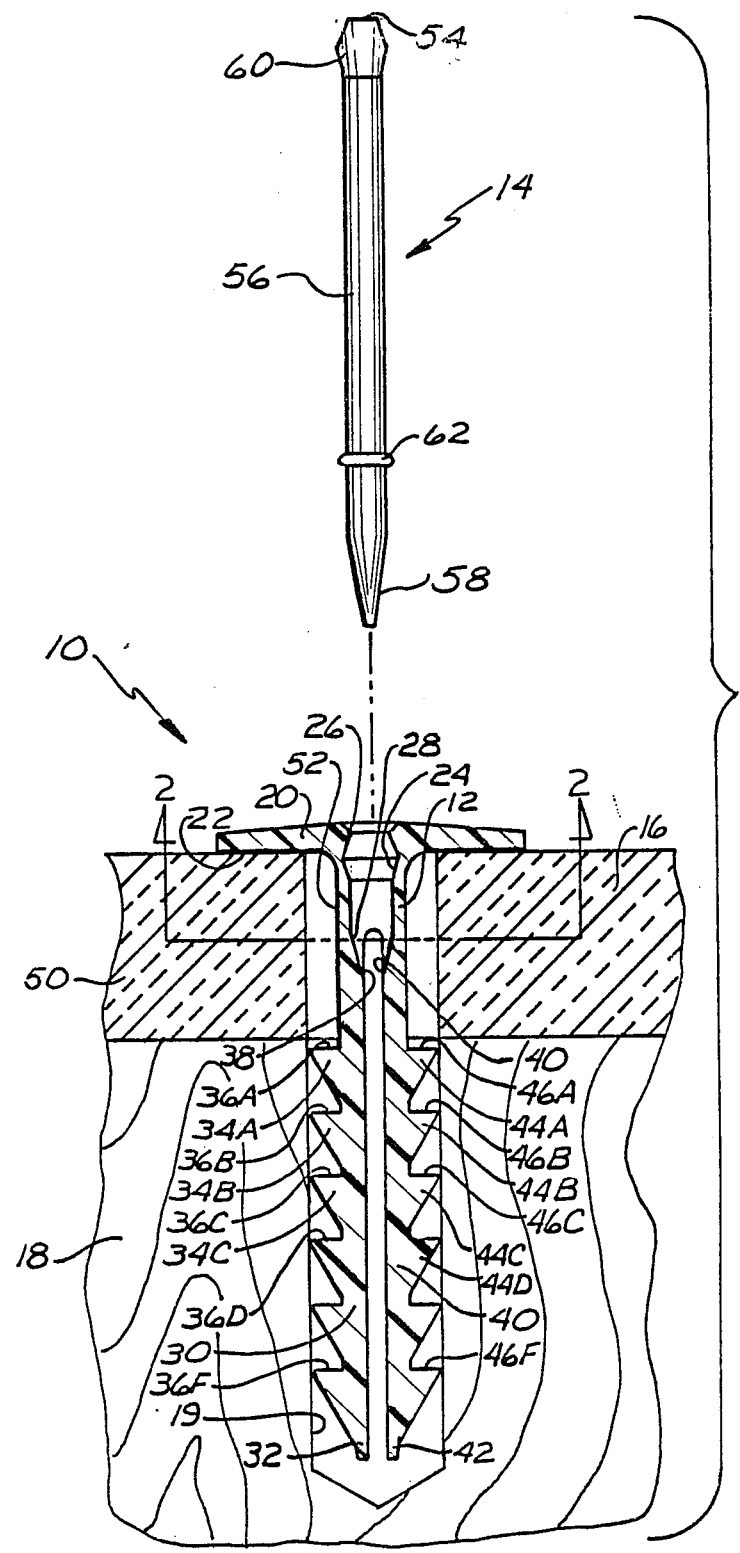
FIG. 1 is a side sectional view of a fastener body and a front side view of a fastener pin which cooperate to form an expansion fastener in accordance with the present invention, said fastener body being illustrated in a non-expanded mode in conjunction with a roofing membrane and a roof deck.

With reference to the drawings wherein like numerals represent like parts throughout the FIGURES, an expansion fastener in accordance with the present invention is generally designated by the numeral 10. The expansion fastener 10 comprises a fastener body 12 and an expander pin 14. In the unactivated mode such as illustrated in FIG. 1, the pin and the body are ordinarily separated prior to installation. In the activated expanded mode of FIG. 3, the expander pin 14 is driven into the fastener body 12 to achieve the loaded expanded configuration. The expanded mode is somewhat exaggerated in the drawing for purposes of illustration.

With reference to FIGS. 1 and 3, in the expanded mode, the expansion fastener anchors a roofing membrane material designated generally by the numeral 16 or a roofing insulation sheet (not illustrated) onto a roofing deck designated generally by the numeral 18. The deck 18 is typically formed of cementitious wood fiber, gypsum or lightweight concrete. The specific longitudinal dimensions of the expansion fastener, in particular, the fastener body 12, typically range from 2 ½ to 10 inches depending on the thickness of the given membrane material or the insulation which is to be fastened in position.

The fastener body 12 includes a head portion 20 having a flattened annular retaining head 22 which engages the upper surface of the membrane 16 for securing the membrane in position. The head typically has a transverse diameter of two to three inches. A central axially extending throat 24 extends through the head and includes an enlarged tapered opening 26 and a lower tapered restriction 28.

A pair of substantially identical anchoring shafts 30 and 40 integrally extend from the head portion 20 and terminate in tapered tips 32 and 42, respectively. The anchoring shafts 30 and 40 are elongated members which are semi-flexibly joined to the head portion 20 and have the appearance in the unloaded mode of a split quasi-cylindrical shaft.

The anchoring shafts each have a series of radially projecting teeth 34a, 34b, and 34c... and 44a, 44b, and 44c..., respectively, which engage the wall of a bore 19 tapped in the 18 to anchor the fastener in position. The teeth may be substantially identical in shape and dimensions and may be generally equidistantly axially spaced along the anchoring shafts 30 and 40, respectively. The teeth form transverse shoulders 36a, 36b, 36c...and 46a, 46b, and 46c..., respectively which preferably extend generally at right angles to the central longitudinal axis of the fastener body in the unloaded FIGURE mode. The transverse shoulders 36 and 46 are generally arcuate in shape. The anchoring shafts form opposing interior bearing surfaces 38 and 40 which define a longitudinal through slot 50. The fastener body 12 also includes generally cylindrical slotted shank 52 which is formed between the underside of the retaining head 22 and the upper teeth 34a and 44a, respectively.

The expander pin 14 includes a head 54, a generally rod-like body 56 of substantially uniform diameter, and a tapered tip 58 at the axial terminus thereof. The expander pin 14 is dimensioned so that the diameter of the intermediate body 56 is generally commensurate with the diameter of the throat 24, and the pin head 54 may be closely seated at the upper portion of the throat 24.

In the illustrated embodiment, the head 54 has a diametral taper which forms a circumferentially extending locking shoulder 60. In addition, the body has an integral collar 62 located at a lower portion spaced from tip 58. The throat 24 has an indentation or socket 64 which is dimensioned to be complementary with the locking shoulder 60 and the collar 62. The locking shoulder 60 and the collar 62 and the cooperative socket 64 are optional features.

In preferred form, the fastener body 12 is inserted through the membrane material (or insulation) into a bore 19 of the deck 18 so that the teeth engage the bore defining surfaces of the deck. The pin tip 58 is inserted in the throat 24. The collar 62 may be snapped into socket 64 to initially retain the pin 14 in the throat 24. A downward force such as a hammer blow is applied to the top of the expander pin head 54. The expander pin 14 is thereby driven through the throat 24 so that the tapered tip 58 is forced into the through slot. As the pin is driven into the fastener body, the surfaces of the expander pin body 56 engage the interior surfaces 38 and 40 of the anchor shafts to wedge the anchor sections apart into an expanded loaded mode as best illustrated in FIG. 3. Upon full insertion, the locking shoulder 60 is forced into socket 64 to lock the pin in the loaded expanded configuration. It will be appreciated that in the unloaded, unactivated mode of FIG. 1, the distance between the opposing bearing surfaces is less than the diameter of the pin and that the anchoring shafts are sufficiently flexible to allow for the radial deflection to the expanded mode.

The fastener body 12 and the expander pin 14 are preferably formed from a non-corrosive material which is durable, but has a limited degree of flexibility and resilience. One material which is suitable for the expander pin and the fastener body is a material marketed by General Electric under the mark "Valox". it will be appreciated that the fastener body and the corresponding expander pin may be dimensioned in accordance with the requirements of a given application. For most roofing applications for which the invention is particularly suit the axial length of the fastener body ranges from $2\frac{1}{2}$ inches to 10 inches and the diameter of the head portion 20 ranges from the order of two inches to three inches. The number of teeth in the preferred embodiment is six. The number of teeth is not a limitation of the invention and other numbers of teeth may also be suitably employed. In the illustrated embodiment, two substantially identical anchoring shafts are illustrated. It should be appreciated that more than two such shafts could also be provided for a given expansion fastener application.

While a preferred embodiment of the foregoing invention has been set forth of purposes of illustrating the expansion fastener, the foregoing description should not be deemed a limitation of the invention herein. Accordingly, various modifications, adaptations and alternatives may occur to one skilled in the art without departing from the spirit and the scope of the present invention.

What is claimed is:

1. An expansion fastener comprising:
   fastener body means comprising a head portion defining an axially extending throat, said throat defining a socket, a pair of axially extending anchoring members integrally extending from said head portion and having opposing interior surfaces defining an axial through slot communicating with said throat, a series of axially spaced teeth projecting from said anchor members, said anchor members having a rounded shank portion interposed between said head portion and said teeth;
   expander pin means comprising a head, a generally radially projecting shoulder portion defined by converging surfaces forming a quasi-V-shaped section adjacent said head, and a longitudinal body terminating in a tip, said pin means being dimensioned for reception in said throat,
   so that said expander pin means may be inserted in said throat and driven into said fastener body means wherein the pin means extends into said slot and interacts with said opposing interior surfaces to force apart said anchor members and said pin shoulder is locked in said socket.

2. The expansion fastener of claim 1 wherein said teeth radially project from said anchor members so as to define generally aligned pairs of generally arcuate transverse shoulders.

3. The expansion fastener of claim 2 wherein each said anchor member has six generally equidistantly axially spaced teeth.

4. The expansion fastener of claim 1 wherein the head portion includes a generally transversely extending head and the throat is generally centrally positioned relative to said head.

5. The expansion fastener of claim 1 wherein said anchor members are forced apart a greater distance at the terminal portions thereof than at intermediate portions thereof.

6. The expansion fastener of claim 1 wherein said anchor members terminate in tapered tips.

7. An expansion fastener comprising:
   a fastener body comprising a head portion, including a retaining head and defining a central, axially extending throat, a pair of substantially identical, axially extending anchor members integrally extending from said head portion and having opposing interior surfaces defining an axial slot communicating with said throat, a series of axially spaced teeth projecting from said anchor members, said anchor members having a rounded shank portion interposed between said head portion and said teeth;
   an expander pin having a head and a longitudinal body terminating in a tapered tip and dimensioned to be closely received in said throat, said longitudinal body having a generally uniform diameter greater than said first distance, said pin having a radially projecting shoulder defined by converging surfaces forming a quasi-V-shaped surface adjacent said head,
   so that said pin may be inserted into said throat and driven into said fastener body wherein the expander pin extends into the slot and wedgingly interacts with opposing interior surfaces to force apart said anchor members and said shoulder is closely received in said socket to prevent axial displacement of said pin from said fastener body.

8. The expansion fastener of claim 7 wherein each said anchor member has six generally equidistantly axially spaced teeth.

9. An expansion fastener comprising:

fastener body means comprising a head portion defining an axially extending throat, said throat further defining an axially symmetric socket, a pair of axially extending anchor members integrally extending from said head portion and having opposing interior surfaces defining an axial through slot communicating with said throat, a series of axially spaced teeth projecting from said anchor members, said anchor members having a rounded shank portion interposed between said head portion and said teeth;

expander pin means comprising a head, a longitudinal body terminating in a tip, and an axially symmetric radially projecting shoulder adjacent said head and having a diameter greater than said head, said pin being dimensioned for reception in said throat, so that said expander pin means is insertable in said throat and drivable into said fastener body means wherein the pin extends into said slot and interacts with said opposing interior surfaces to force apart said anchor members and said pin projecting portion is received in said socket to axially lock the expander pin means to the fastener body means.

10. The expansion fastener of claim 9 wherein said teeth radially project from said anchor members so as to define generally aligned pairs of generally arcuate transverse shoulders.

11. The expansion fastener of claim 10 wherein each said anchor member has six generally equidistantly axially spaced teeth.

12. The expansion fastener of claim 1 wherein said expander pin means further comprises a radially projecting collar axially spaced from said shoulder, said collar being dimensioned for reception in said socket to releasably retain said expander pin means to said fastener body means.

13. The expansion fastener of claim 7 wherein said expander pin further comprises a circumferential radially projecting collar axially spaced from said shoulder, said collar being dimensioned for reception in said socket to releasably retain said expander pin to said fastener.

14. The expansion fastener of claim 9 wherein said expander pin means further comprises a radially projecting collar axially spaced from said shoulder, said collar being dimensioned for reception in said socket to releasably retain said expander pin means to said fastener body means.

* * * * *